(12) United States Patent
Yoshida et al.

(10) Patent No.: US 7,194,923 B2
(45) Date of Patent: Mar. 27, 2007

(54) STRAIN DETECTOR AND PRESSURE SENSOR

(75) Inventors: Naoki Yoshida, Tokyo (JP); Hiroshi Kodama, Tokyo (JP); Hiroshi Nagasaka, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 155 days.

(21) Appl. No.: 11/066,907

(22) Filed: Feb. 25, 2005

(65) Prior Publication Data

US 2005/0193836 A1 Sep. 8, 2005

(30) Foreign Application Priority Data

Mar. 3, 2004 (JP) .............................. 2004-058578

(51) Int. Cl.
*G01L 9/06* (2006.01)
(52) U.S. Cl. ................. 73/862.628; 73/718; 73/723; 73/760; 73/862.381; 73/862.621; 73/862.625; 73/862.627; 29/621.1
(58) Field of Classification Search ............. 73/718, 73/723, 760, 862.381, 862.621, 862.625, 73/862.627, 862.628
See application file for complete search history.

(56) References Cited

U.S. PATENT DOCUMENTS

| | | | | |
|---|---|---|---|---|
| 3,858,150 A | * | 12/1974 | Gurtler et al. ................. 338/2 |
| RE29,009 E | * | 10/1976 | Jeffers ......................... 73/777 |
| 4,658,233 A | * | 4/1987 | Uchida et al. ................. 338/5 |
| 5,332,469 A | * | 7/1994 | Mastrangelo .................. 216/2 |
| 6,444,487 B1 | * | 9/2002 | Boggs et al. .................. 438/48 |
| 6,651,506 B2 | * | 11/2003 | Lee et al. ...................... 73/718 |
| 6,865,799 B2 | * | 3/2005 | Hata et al. ................... 29/621.1 |
| 6,915,702 B2 | * | 7/2005 | Omura et al. .................. 73/777 |
| 2003/0079551 A1 | * | 5/2003 | Hata et al. ...................... 73/760 |
| 2003/0213307 A1 | * | 11/2003 | Kaneko et al. ................ 73/720 |
| 2004/0063238 A1 | * | 4/2004 | Nagasaka et al. ............. 438/50 |
| 2006/0099821 A1 | * | 5/2006 | Nagasaka et al. ........... 438/758 |

FOREIGN PATENT DOCUMENTS

| | | |
|---|---|---|
| DE | 197 54 613 A1 | 6/1998 |
| JP | 01-235824 | 9/1989 |
| JP | H08-136378 | 5/1996 |

* cited by examiner

*Primary Examiner*—Edward Lefkowitz
*Assistant Examiner*—Freddie Kirkland, III
(74) *Attorney, Agent, or Firm*—Rankin, Hill, Porter & Clark LLP

(57) ABSTRACT

A thin-film resistor (5) provided on a strain-generating part (2) via an insulating film (4) and an electrode thin-film (6) including an electrode pad (10) arranged in the thin-film resistor (5) are provided. The thin-film resistor (5) includes a strain-detecting thin-film resistive part (8) and an electrode connection (9) connected to the resistive part (8). The electrode connection (9) is formed to extend to the electrode pad (10). The electrode pad (10) includes an external-connection bonding area (12) and a testing probe area (13) formed at different positions. The electrode pad (10) is disposed on a tubular rigid body (1) provided at the outer peripheral edge of a strain-generating part (2).

10 Claims, 7 Drawing Sheets

STRAIN DETECTOR AND PRESSURE SENSOR

BACKGROUND OF THE INVENTION

1. Field of the Invention

The present invention relates to a strain detector that includes a strain-detecting thin-film resistive part provided on a thin plate-shaped strain-generating part formed inside a tubular rigid body via an insulating film and an electrode thin-film provided on the strain-detecting thin-film portion, and a pressure sensor equipped with the strain detector.

2. Description of the Related Art

Pressure sensors have been traditionally used in order to detect fluid pressure or the like. Among the pressure sensors, such a pressure sensor is known that converts pressure of fluid or the like into strain through a thin plate-shaped diaphragm (a strain-generating part), and then takes out signals of the strain as a change of electrical resistance with a strain gauge that is a thin-film resistor formed on the diaphragm.

Various types of thin-film patterns are formed on the diaphragm of the pressure sensor.

For example, an insulating thin film, a thin-film resistor and an electrode thin-film are formed sequentially on a diaphragm that is formed inside a tubular portion, which is an example of prior art (refer to literature 1; Japanese Patent Laid-Open Publication No. 1-235824, FIG. 1, FIG. 2 and others). According to the literature 1, a thin film requiring patterning thereon is provided with a desired pattern by means of photolithography technology and the like, and two strain gauges of thin-film resisters are disposed in the vicinity of center of the diaphragm for receiving tensile strain as well as two are disposed in the vicinity of an edge of the diaphragm for receiving compressive strain, then a thin-film resistance is connected in a full-bridge circuit via electrodes so that electrical signals are taken out.

Further, there is another example of prior art (refer to literature 2; Japanese Patent Laid-Open Publication No. 8-136378, FIG. 1 and others), that is, a strain gauge is disposed in the center of a diaphragm, and electrode pads connected to respective terminals of the strain gauge are arranged along the outer peripheral edge of the diaphragm with offset to one side.

According to the literature 1, the thin-film resistor is connected to the electrode thin-film at electrode connections, and the electrode pad is arranged on the insulating film via the electrode connections where the thin-film resistor and the electrode thin-film are lapped over each other. Since the position of the electrode pad that is the interface between the electrode connection and the electrode thin-film forms a step, hence the electrode thin-film covering the thin-film resistor needs to be thicker than the thin-film resistor, which leads to be expensive. In addition, a step portion of the electrode thin-film is likely to have stress concentration, which causes a drawback of deteriorated electrical connection when forming an external-connection terminal with full-bridge circuit connection of strain gauge.

According to the literature 2, characteristics of a strain detector are examined by contacting an electrode pad portion with a testing probe, and then gold or aluminum wire bonding executes connection to the outside. In this case, a testing probe often damages the electrode pad, which not only causes a poor visual effect but also decreases reliability of wire bonding performed at an identical position of the electrode pad in the post-process.

SUMMARY OF THE INVENTION

A main object of the present invention is to provide a strain detector and a pressure sensor that can be electrically connected to a strain-detecting thin-film resistive part with high reliability.

A strain detector according to the present invention forms a thin plate inside a tubular rigid body composing a strain-generating part, on which a strain-detecting thin-film resistive part provided via an insulating film, and an electrode thin-film forming an electrode pad to cover an electrode connection connected to the strain-detecting thin-film resistive part without any steps, wherein the electrode pad includes an external-connection bonding area and a testing probe area that are arranged at a side of the tubular rigid body and at different positions, and the electrode connection is formed to extend to the electrode pad.

According to the present invention with the arrangement described above, since the electrode connection extends to the electrode pad, a step between the electrode thin-film and the electrode connection is eliminated. Thus stress does not concentrate on the electrode thin-film. Consequently, reliability of electrical connection of the resistive part to the electrode pad through the electrode connection is improved.

In addition, when the testing probe area is used to examine characteristics of the strain detector, the external-connection bonding area does not have a trace of an examination since the external-connection bonding area and the testing probe area are individually formed. As a result, not only does the appearance of the external-connection bonding area remain favorable, but also reliability when bonding a wire in this area is improved.

Moreover, as the electrode pad is placed on a thin film forming surface of the tubular rigid body, no strain is generated on the electrode pad when pressure is applied, and long-term reliability of the external-connection bonding area can be improved.

According to the present invention, the resistive part is provided with a strain gauge including four resistors, each of which is connected to the respective electrode connection, and each of the electrode connections is covered with a conductor including the electrode pad. It is preferable that areas of a pair of the electrode connections and the conductors that are in a signal input side being opposed each other are equal, and areas of a pair of the electrode connections and the conductors that are in a signal output side being opposed each other are equal.

According to the present invention with such construction as described above, even if areas of the conductors of the electrode connections connected to all resistors of the strain gauge are not identical, noises in the signal input side and the signal output side of the strain gauge cancel each other, which leads to effective reduction of external noises.

It is preferable that the strain-generating part is made of a metal material or a semiconductor material, the insulating film is formed to extend to an outer peripheral edge of the thin film forming surface of the tubular rigid body, the external-connection bonding area and the testing probe area are arranged side by side along the outer peripheral edge of the thin film forming surface, an outer peripheral edge of the electrode pad is equally spaced from an outer peripheral edge of the insulating film, and a distance between the outer peripheral edge of the electrode pad and the outer peripheral edge of the insulating film is preferably equal to or more than 0.5 mm.

According to the present invention with such construction as described above, dielectric strength between a metal substrate portion and the electrode pad can be AC 350 V, which is a value adapted to the practical requirement of the industrial measurement equipment.

It is preferable that the electrode thin-film is formed on the thin film forming surface, and has a pattern to be broadened from the electrode connection toward the electrode pad and the electrode pad is arranged to one side on the thin film forming surface.

According to the present invention with such construction as described above, the entire size of the strain detector can be smaller, securing useful area for the external-connection bonding area and the detection probe area from a functional view point.

It is preferable that the resistive part and the electrode connection are formed on the identical thin film layer, and the resistive part serves as a full-bridge circuit.

According to the present invention with such construction as described above, the resistive part and the electrode connection are formed on the identical thin film layer and there is no step in between. Therefore, the reliability of the circuit itself is improved.

The pressure sensor according to the present invention is preferably provided with the aforementioned strain detector therein.

The present invention of the construction described above can provide a pressure sensor having the aforementioned advantages of the strain detector.

DETAILED DESCRIPTION OF PREFERRED EMBODIMENTS

An embodiment of the present invention will be described below with reference to accompanying drawings.

FIGS. 1 to 4 show a strain detector according to the embodiment. In the embodiment, the strain detector is provided in a pressure sensor (not shown).

Figure 1:
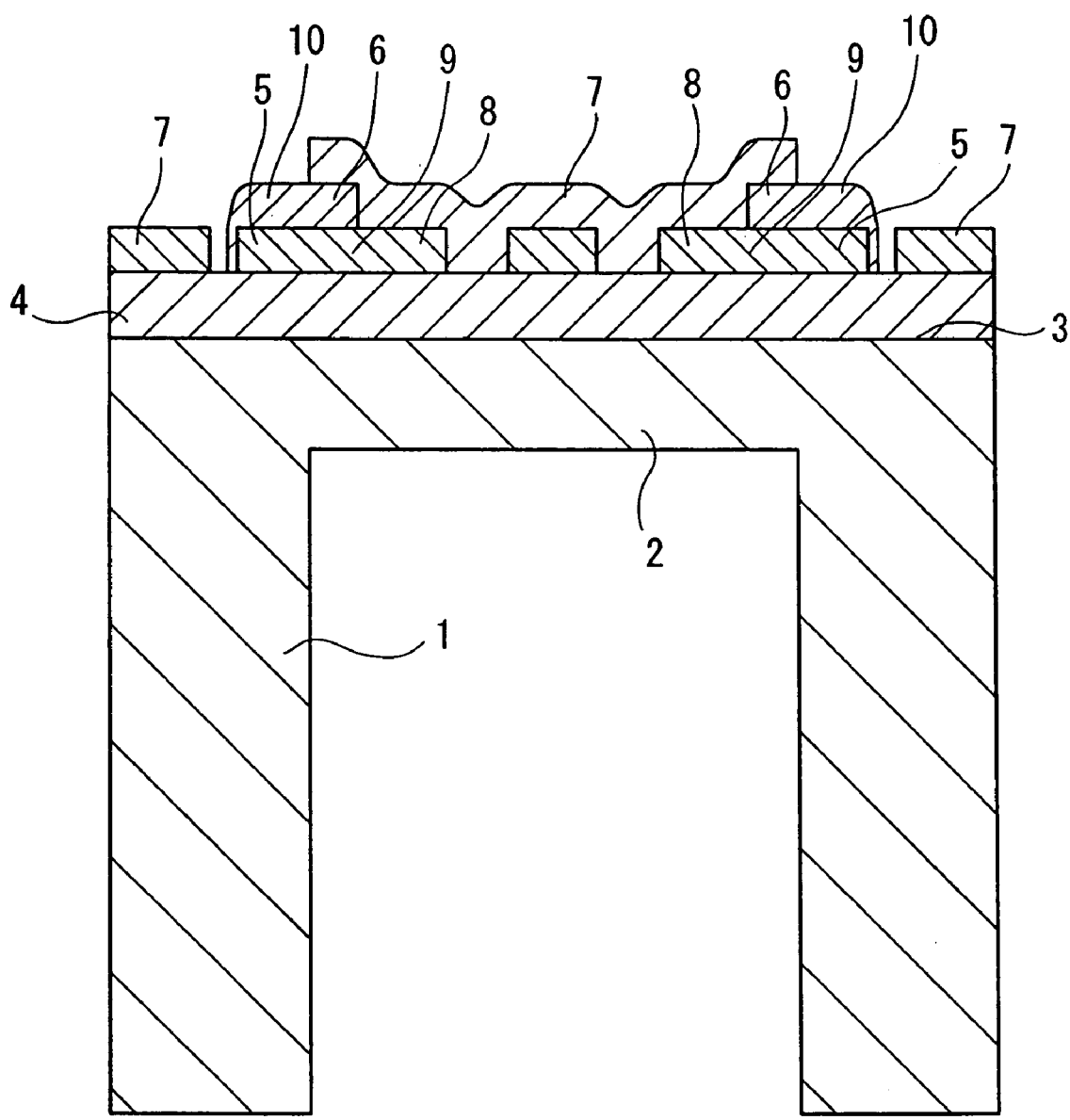
FIG. 1 is a cross-sectional view showing a strain detector according to one embodiment of the present invention.
Figure 2:
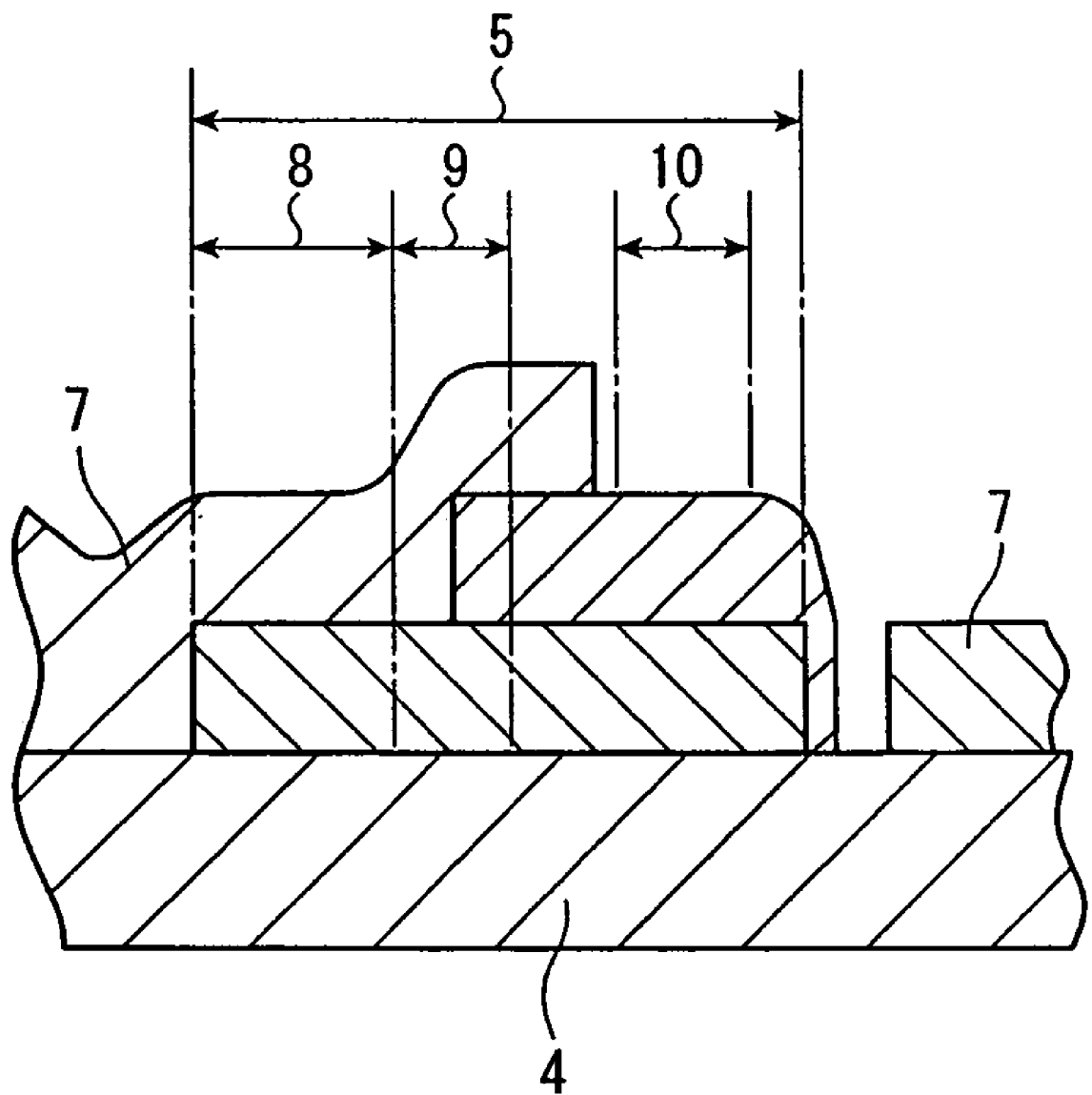
FIG. 2 is an enlarged cross-sectional view of a principal portion of FIG. 1.
Figure 3:
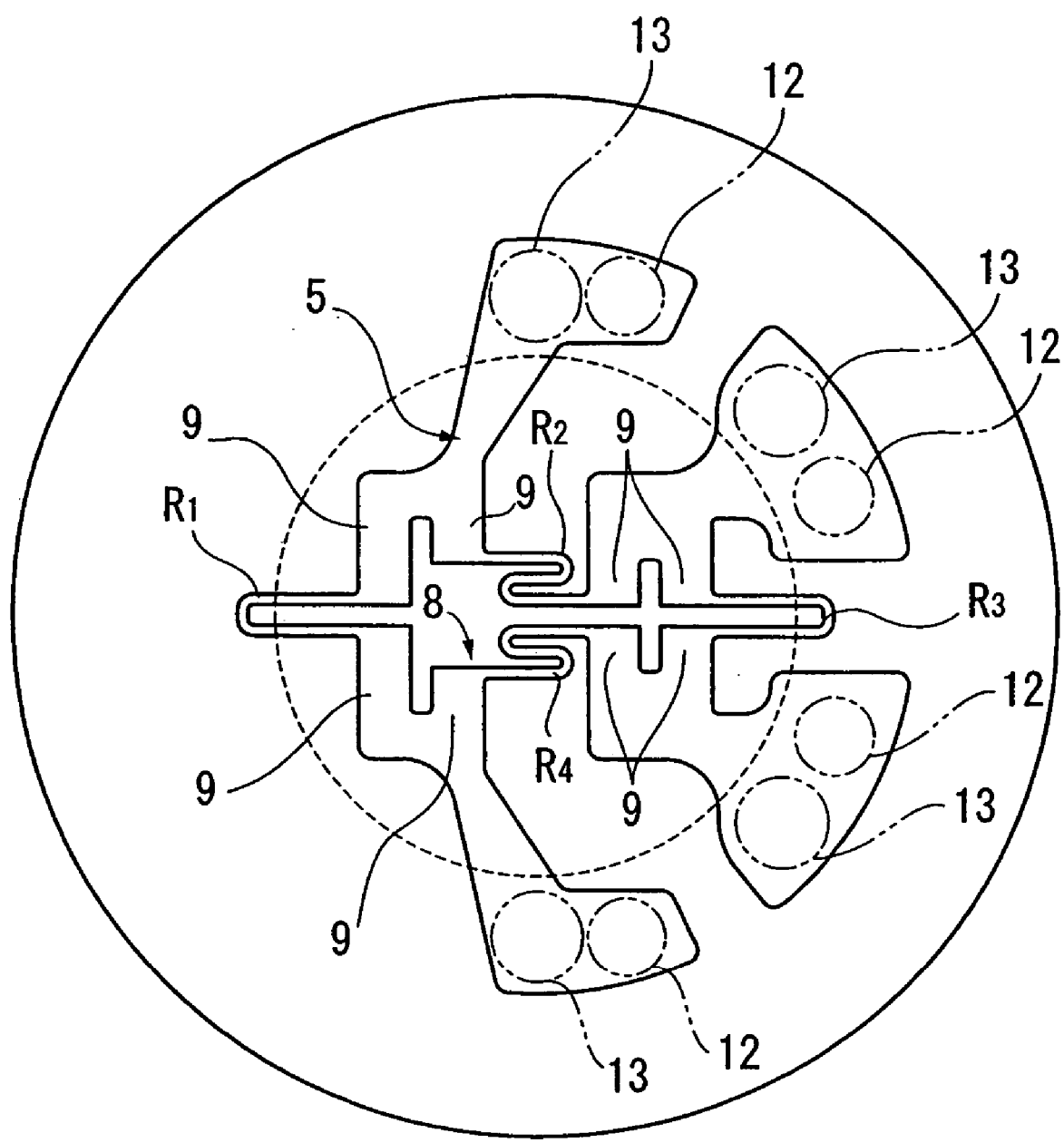
FIG. 3 is a drawing showing a pattern of a thin-film resistance.
Figure 4:
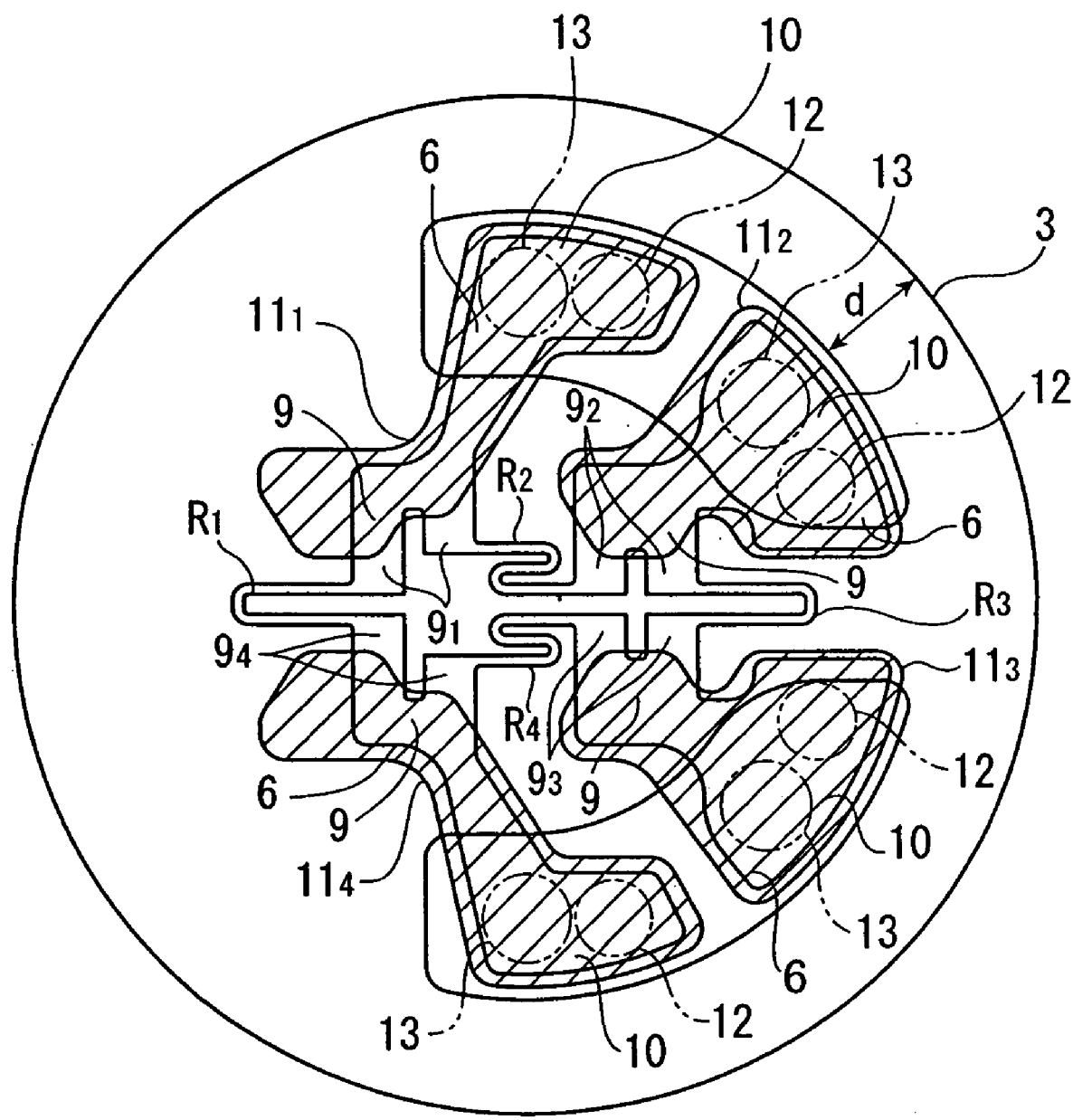
FIG. 4 is a drawing showing a pattern in a state that an electrode thin-film and a protective film are provided on the thin-film resistance in FIG. 3.

FIG. 1 is a cross-sectional view showing a strain detector. FIG. 2 is an enlarged cross-sectional view of a pertinent portion of FIG. 1. FIG. 3 is a drawing showing a pattern of thin-film resistance. FIG. 4 is a drawing showing a pattern in such a state that an electrode thin-film and a protective film are provided on the thin-film resistance in FIG. 3.

Referring to FIG. 1 showing an entire structure of the strain detector, the strain detector is provided with a substrate including a tubular rigid body 1 in an approximately cylindrical shape and a thin plate-shaped strain-generating part 2 integrated into an inner side of the tubular rigid body 1. The tubular rigid body 1 and the strain-generating part 2 are formed of a metal material or a semiconductor material. In order to form these, various methods of processing are used, such as machining, plastic forming, electric discharge machining, corrosion working or the like.

Each end surface of the strain-generating part 2 and the tubular rigid body 1 is formed on an identical plane and is mirror-finished to be a thin film forming surface 3.

An insulating film 4 is formed on the thin film forming surface 3 by vapor deposition, coating, or printing. The insulating film 4 is formed to extend to the outer peripheral edge of the thin film forming surface 3 of the tubular rigid body 1.

A thin-film resistor 5 is formed on the surface opposite to the thin film forming surface 3 of the insulating film 4 by vapor deposition or sputtering. The thin-film resistor 5 is provided with an electrode thin-film 6. Further, a protective film 7 is provided on a top layer of the electrode thin-film 6 and the thin film forming surface 3.

The thin-film resistor 5 includes a strain-detecting thin-film resistive part 8 and an electrode connection 9 connected to the resistive part 8. The resistive part 8 and the electrode connection 9 are formed in an identical thin film layer.

As shown in FIG. 2, the electrode connection 9 extends to an electrode pad 10 that composes a part of the electrode thin-film 6. That is, the thin-film resistor 5 is formed to have a same dimension with respect to the thin film forming surface 3 without any steps to the point corresponding to the electrode pad 10.

The electrode thin-film 6 is formed by vapor deposition or sputtering after a mask is set on the thin film forming surface 3.

The protective film 7 is made of a silicon oxide film or a silicon nitride film and formed to keep away from the electrode pad 10.

FIG. 3 and FIG. 4 show a thin-film pattern of a strain detector. The thin-film pattern is formed by means of lithography.

Referring to FIG. 3 and FIG. 4, the resistive part 8 serves as a full-bridge circuit equipped with a strain gauge R having four resistors $R_1$, $R_2$, $R_3$ and $R_4$, each of which is connected to each of the electrode connections 9 respectively.

Among areas of: conductor $11_1$ including the electrode pad 10 and electrode connection $9_1$ not covered by the conductor $11_1$; conductor $11_2$ including the electrode pad 10 and electrode connection $9_2$ not covered by the conductor $11_2$; conductor $11_3$ including the electrode pad 10 and electrode connection $9_3$ not covered by the conductor $11_3$; and conductor $11_4$ including the electrode pad 10 and electrode connection $9_4$ not covered by the conductor $11_4$, on a pair of signal input sides that are opposing each other, the area of conductor $11_1$ including the electrode pad 10 and electrode connection $9_1$ not covered by the conductor $11_1$ are equal to the area of conductor $11_3$ including the electrode pad 10 and electrode connection $9_3$ not covered by the conductor $11_3$; while on a pair of signal output sides that are opposing each other, the area of conductor $11_2$ including the electrode pad 10 and electrode connection $9_2$ not covered by the conductor $11_2$ are equal to the area of conductor $11_4$ including the electrode pad 10 and electrode connection $9_4$ not covered by the conductor $11_4$.

Four electrode pads 10 are placed at the periphery side of the tubular rigid body. Each electrode pad 10 includes an external-connection bonding area 12 and a testing probe area 13 at different spots respectively.

Both of the external-connection bonding areas 12 and the testing probe areas 13 have predetermined shapes (for example, a circle), and are placed side by side along the outer peripheral edge of the thin film forming surface 3.

The outer peripheral edge of the electrode pad 10 is equally spaced with reference to the outer peripheral edge of the insulating film 4. The distance d between the outer peripheral edge of the electrode pad 10 and the outer peripheral edge of the insulating film 4 is set to a predetermined dimension.

Figure 5:
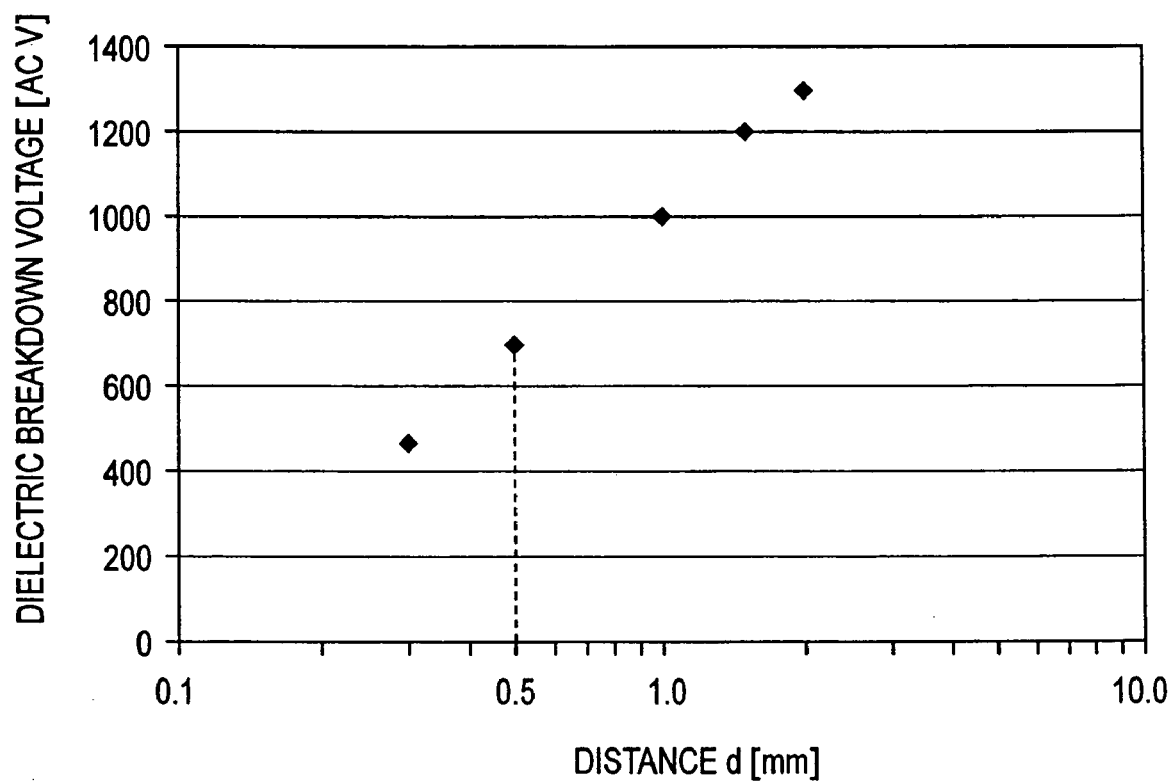
FIG. 5 is a graph illustrating a relationship between the distance d from an outer periphery of an electrode thin-film to an edge of an insulating film and a dielectric breakdown voltage V.

FIG. 5 shows a graph illustrating a relationship between the distance d from the outer periphery of the electrode thin-film to the edge of the insulating film and a dielectric breakdown voltage V.

In FIG. 5, dielectric breakdown voltage V is AC 700 V when the distance d is 0.5 mm, and dielectric breakdown voltage V is AC 1000 V when the distance d is 1.0 mm.

It is obvious from the graph of FIG. 5 that the distance d has a relative relationship with dielectric breakdown voltages. According to the embodiment, the distance d is preferably equal to or more than 0.5 mm so that the strain detector is adapted to AC 350 V, which is a practical requirement of industrial measurement equipment.

The electrode thin-film 6 is shaped to be broadened from the electrode connection 9 toward the electrode pad 10 and is formed so that shifted to the right side on the thin film forming surface 3 in the drawings.

According to the embodiment as described above, following advantages can be obtained.

(1) On the strain-generating part 2, a thin-film resistor 5 disposed via insulating film 4 and an electrode thin-film 6 forming electrode pad 10 disposed on the thin-film resistor 5 are provided. The thin-film resistor 5 includes electrode connections 9, connected to a resistive part 8 without any steps. Since the electrode connections 9 are extended to the electrode pads 10, steps between the electrode thin-film 6 and the electrode connections 9 are eliminated, thus stress does not concentrate on the electrode pad 10. As a result, reliability of the electrical connection of the resistive part 8 through electrode pad 10 is improved.

(2) The electrode pad 10 has an external-connection bonding area 12 and a testing probe area 13, each of which is formed at different spots. The testing probe area is used in characteristics examination of the detector, which causes no trace of an examination left on the external-connection bonding area. Therefore, not only does the external-connection bonding area have a favorable appearance, but also reliability can be improved when bonding wires in this area.

(3) As the electrode pad 10 is arranged above the tubular rigid body 1 provided at the outer peripheral edge of the strain-generating part 2, no strain generated in the electrode pad 10 when pressure is applied, therefore long-term reliability of the external-connection bonding area 12 can be improved.

(4) The resistive part 8 for detecting strain is provided with a strain gauge including four resistors $R_1$, $R_2$, $R_3$ and $R_4$. Each resistor of the strain gauge, $R_1$, $R_2$, $R_3$ and $R_4$ is connected to electrode connections 9 respectively. These electrode connections 9 are covered with conductors $11_1$, $11_2$, $11_3$, and $11_4$, each including the electrode pad 10. Among areas of: conductor $11_1$ including the electrode pad 10 and electrode connection $9_1$ not covered by the conductor $11_1$; conductor $11_2$ including the electrode pad 10 and electrode connection $9_2$ not covered by the conductor $11_2$; conductor $11_3$ including the electrode pad 10 and electrode connection $9_3$ not covered by the conductor $11_3$; and conductor $11_4$ including the electrode pad 10 and electrode connection $9_4$ not covered by the conductor $11_4$, on a pair of signal input sides that are opposing each other, the area of conductor $11_1$ including the electrode pad 10 and electrode connection $9_1$ not covered by the conductor $11_1$ are equal to the area of conductor $11_3$ including the electrode pad 10 and electrode connection $9_3$ not covered by the conductor $11_3$; while on a pair of signal output sides that are opposing each other, the area of conductor $11_2$ including the electrode pad 10 and electrode connection $9_2$ not covered by the conductor $11_2$ are equal to the area of conductor $11_4$ including the electrode pad 10 and electrode connection $9_4$ not covered by the conductor $11_4$. As a formation is made in this way, even if the areas of the conductors and the electrode connections 9 being connected to all resistors of the strain gauge are not equal, it is possible to lower the external noises effectively. That is, if the signal input side and the signal output side have a same capacitance between the electrode thin-film and the substrate (the tubular rigid body 1 and the strain-generating part 2), it is possible to cancel external noises effectively.

(5) The strain-generating part 2 is made of a metal material or a semiconductor material. The insulating film 4 is formed to extend to the outer peripheral edge of the thin film forming surface 3 on the tubular rigid body 1. The external-connection bonding area 12 and the testing probe area 13 are arranged side by side along the outer peripheral edge of the thin film forming surface 3. The outer peripheral edge of the electrode pad 10 is equally spaced from the outer peripheral edge of the insulating film 4. The distance between the outer peripheral edge of the electrode pad 10 and the outer peripheral edge of the insulating film 4 is equal to or more than 0.5 mm. Therefore, dielectric strength between the metal substrate portion and the electrode pad is possibly set to AC 350 V, which is an amount adapted to the practical requirement of the industrial measurement equipment.

(6) The electrode thin-film 6 has a pattern to be broadened from the electrode connection 9 toward the electrode pad 10 and is formed so that shifted to the right side on the thin film forming surface 3 in the drawings. Thus, the entire size of a strain detector can be smaller, securing a useful area for the external-connection bonding area 12 and the testing probe area 13 from function view point.

(7) The resistive part 8 and the electrode connection 9 are formed in an identical thin film layer, and the resistive part 8 serves as a full-bridge circuit including a strain gauge. Since steps do not exist between the resistive part 8 and the electrode connection 9, reliability of the circuit itself is improved.

(8) A pressure sensor according to the embodiment has a constitution equipped with a strain detector, accordingly it is possible to provide a pressure sensor having advantages of the strain detector described above.

It should be noted that a preferred embodiment according to the present invention has been described but the present invention is not limited to the embodiment described above and various changes and modifications in the scope where an object of the present invention can be attained are to be included in the invention.

Figure 6:
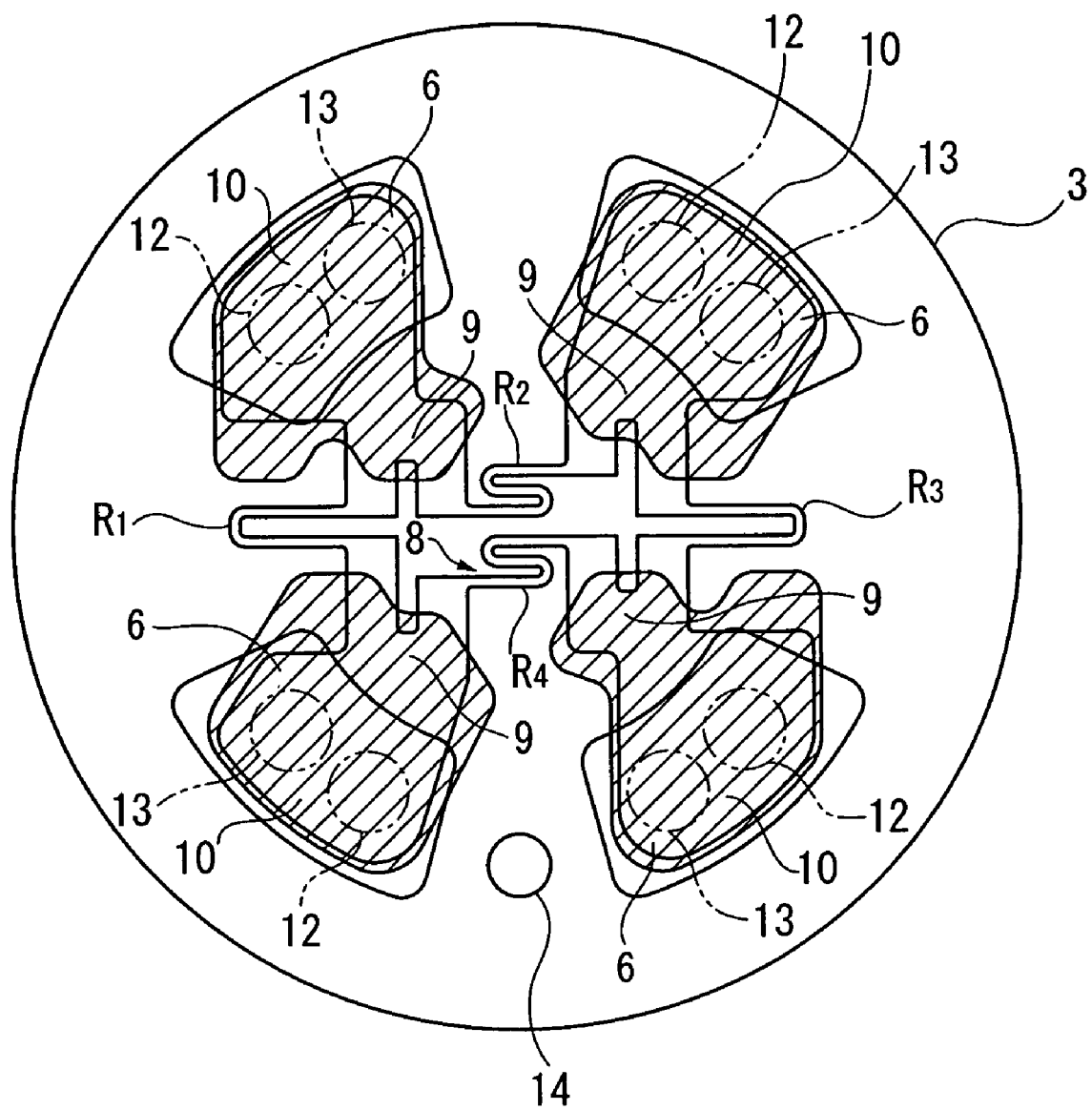
FIG. 6 is a drawing showing an alternative embodiment of the present invention which corresponds to FIG. 4.
Figure 7:
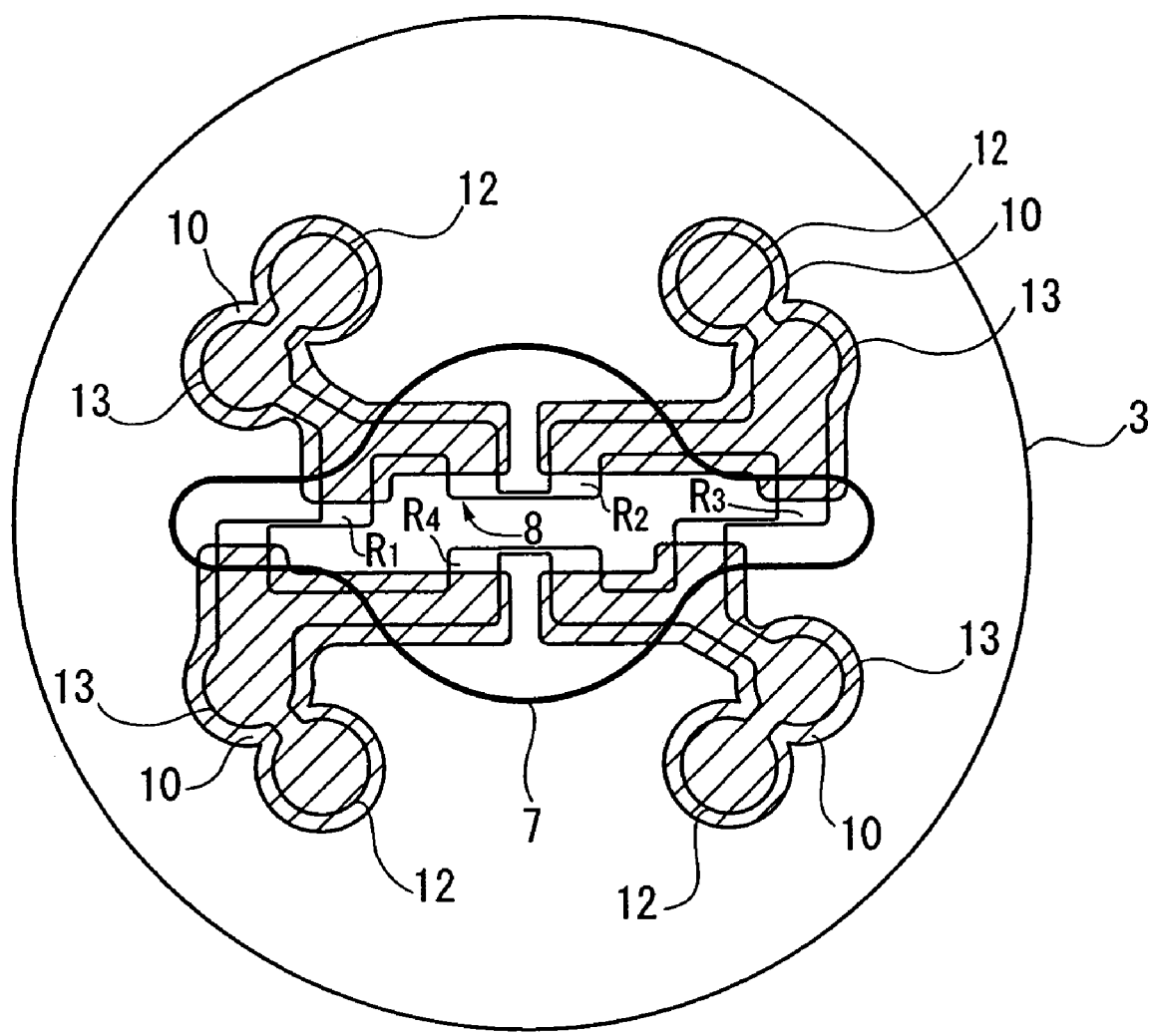
FIG. 7 is a drawing showing another alternative embodiment of the present invention which corresponds to FIG. 4.

For instance, in the present invention, the thin-film resistance pattern and the electrode thin-film pattern are not limited to that shown in FIG. 3 and FIG. 4. According to the embodiment, the thin-film resistance pattern and the electrode thin-film pattern have such shapes as shifted to the one side from the center of the thin film forming surface, but may be symmetrical about a point relative to the center of the thin film forming surface as shown in FIG. 6 or FIG. 7 in the present invention. Further, in the present invention, the shape of the electrode thin-film is not necessarily required to be a pattern to be broadened from the electrode connection toward the electrode pad.

Moreover, a strain detector according to the present invention may be used for a load sensor or other measuring instruments other than a pressure sensor.

According to the embodiment described above, the external-connection bonding area 12 and the testing probe area 13 are arranged side by side along the outer peripheral edge of the thin film forming surface 3 but may be arranged along radial direction of the thin film forming surface 3.

Incidentally, as shown in FIG. 6, a mark 14 for positioning upon necessities is formed on the thin film forming surface 3. The mark 14 can be recognized optically or electromagnetically, and can be formed at the same time when forming the strain-detecting thin-film resistive part 8 or the electrode thin-film 6, for example. With the mark 14, positioning can be carried out at the time of masking, and each electrode pad 10 can be recognized as No. 1, No. 2 and No. 3 in clockwise relative to the mark 14. Please note that such a mark 14 does not have to be required, but can be substituted by other recognizable mark, pattern, convexoconcave or the like.

The priority application Number JP2004-058578 upon which this patent application is based is hereby incorporated by reference.

What is claimed is:

1. A strain detector, comprising:
   a strain-generating part formed as a thin plate inside a tubular rigid body;
   a strain-detecting thin-film resistive part provided on the strain-generating part through an insulating film; and
   an electrode thin-film forming an electrode pad to cover an electrode connection connected to the strain-detecting thin-film resistive part without any steps, wherein:
   the electrode pad includes an external-connection bonding area and a testing probe area that are arranged at a side of the tubular rigid body and formed at different positions; and
   the electrode connection extends to the electrode pad.

2. The strain detector according to claim 1, wherein:
   the strain-detecting thin-film resistive part is provided with a strain gauge including four resistors;
   each of the four resistors of the strain gauge is connected to each of the electrode connections;
   said electrode connections are covered with a conductor including the electrode pad;
   areas of a pair of the electrode connections and the conductors, which are on signal input sides opposing each other, are equal; and
   areas of a pair of the electrode connections and the conductors, which are on signal output sides opposing each other, are equal.

3. The strain detector according to claim 1, wherein:
   the strain-generating part is made of a metal material or a semiconductor material;
   the insulating film extends to an outer peripheral edge of a thin film forming surface of the tubular rigid body;
   the external-connection bonding area and the testing probe area are arranged side by side along the outer peripheral edge of the thin film forming surface;
   an outer peripheral edge of the electrode pad is equally spaced from an outer peripheral edge of the insulating film; and
   a distance between the outer peripheral edge of the electrode pad and the outer peripheral edge of the insulating film is at least 0.5 mm.

4. The strain detector according to claim 1, wherein:
   the electrode thin-film is formed on the thin film forming surface, and has a pattern that broadens as the electrode thin film extends from the electrode connection toward the electrode pad and the electrode pad is arranged to one side on the thin film forming surface.

5. The strain detector according to claim 1, wherein:
   the strain-detecting thin-film resistive part and the electrode connection are formed in an identical thin film layer; and
   the strain-detecting thin-film resistive part serves as a full-bridge circuit.

6. A pressure sensor, comprising:
   a strain-generating part formed as a thin film inside a tubular rigid body;
   a strain-detecting thin-film resistive part provided on the strain-generating part through an insulating film; and
   an electrode thin-film forming an electrode pad to cover an electrode connection connected to the strain-detecting thin-film resistive part without any steps, wherein:
   the electrode pad includes an external-connection bonding area and a testing probe area that are arranged at a side of the tubular rigid body and formed at different positions; and
   the electrode connection extends to the electrode pad.

7. The pressure sensor according to claim 6, wherein:
   the strain-detecting thin-film resistive part is provided with a strain gauge including four resistors;
   each of the four resistors of the strain gauge is connected to each of the electrode connections;
   said electrode connections are covered with a conductor including the electrode pad;
   areas of a pair of the electrode connections and the conductors, which are on signal input sides opposing each other, are equal; and
   areas of a pair of the electrode connections and the conductors, which are on signal output sides opposing each other, are equal.

8. The pressure sensor according to claim 6, wherein:
   the strain-generating part is made of a metal material or a semiconductor material;
   the insulating film extends to an outer peripheral edge of a thin film forming surface of the tubular rigid body;
   the external-connection bonding area and the testing probe area are arranged side by side along the outer peripheral edge of the thin film forming surface;
   an outer peripheral edge of the electrode pad is equally spaced from an outer peripheral edge of the insulating film; and
   a distance between the outer peripheral edge of the electrode pad and the outer peripheral edge of the insulating film is at least 0.5 mm.

9. The pressure sensor according to claim 6, wherein:
   the electrode thin-film is formed on the thin film forming surface, and has a pattern that broadens as the electrode thin film extends from the electrode connection toward the electrode pad and the electrode pad is arranged to one side on the thin film forming surface.

10. The pressure sensor according to claim 6, wherein:
    the strain-detecting thin-film resistive part and the electrode connection are formed in an identical thin film layer; and
    the strain-detecting thin-film resistive part serves as a full-bridge circuit.

* * * * *